(12) United States Patent
Vivanco et al.

(10) Patent No.: US 11,006,432 B2
(45) Date of Patent: May 11, 2021

(54) MANAGING SIGNAL TRAFFIC IN A 5G OR OTHER NEXT GENERATION WIRELESS NETWORK

(71) Applicants: AT&T Technical Services Company, Inc., Vienna, VA (US); AT&T Intellectual Property I, L.P., Atlanta, GA (US)

(72) Inventors: Daniel Vivanco, Ashburn, VA (US); Slawomir Stawiarski, Carpentersville, IL (US); Mark Stockert, San Antonio, TX (US)

(73) Assignees: AT&T INTELLECTUAL PROPERTY I, L.P., Atlanta, GA (US); AT&T TECHNICAL SERVICES COMPANY, INC., Vienna, VA (US)

( * ) Notice: Subject to any disclaimer, the term of this patent is extended or adjusted under 35 U.S.C. 154(b) by 0 days.

(21) Appl. No.: 16/532,977

(22) Filed: Aug. 6, 2019

(65) Prior Publication Data

US 2021/0045131 A1    Feb. 11, 2021

(51) Int. Cl.
*H04W 72/08* (2009.01)
*H04W 72/04* (2009.01)
*H04W 28/08* (2009.01)

(52) U.S. Cl.
CPC ......... *H04W 72/085* (2013.01); *H04W 28/08* (2013.01); *H04W 72/042* (2013.01)

(58) Field of Classification Search
CPC .. H04W 72/085; H04W 28/08; H04W 72/042
USPC ........................................................ 455/450
See application file for complete search history.

(56) References Cited

U.S. PATENT DOCUMENTS

| | | | | |
|---|---|---|---|---|
| 5,561,846 | A * | 10/1996 | Hagio | H04W 36/30 370/337 |
| 2008/0134194 | A1* | 6/2008 | Liu | H04W 16/04 718/105 |
| 2015/0304889 | A1* | 10/2015 | Qian | H04W 28/085 370/235 |
| 2017/0064031 | A1* | 3/2017 | Sunay | H04W 72/0486 |
| 2017/0071007 | A1* | 3/2017 | Wang | H04W 4/70 |
| 2017/0187632 | A1* | 6/2017 | Ko | H04B 10/278 |
| 2019/0074937 | A1* | 3/2019 | Bhattad | H04L 5/0091 |

* cited by examiner

*Primary Examiner* — Inder P Mehra
(74) *Attorney, Agent, or Firm* — Amin, Turocy & Watson, LLP

(57) ABSTRACT

The technologies described herein are generally directed toward managing signal traffic in a wireless network. Example operations can include receiving, for a group of cells, a control channel utilization value for a control channel and a data channel utilization value for a data channel. The operations can further include generating, based on the control channel utilization value and a threshold, for a first cell of the group of cells, a channel allocation that can increase the balance of use of control channel resources and data channel resources for the first cell, and configuring the first cell of the group of cells to allocate control channel resources and data channel resources of the first cell based on the channel allocation.

20 Claims, 11 Drawing Sheets

MANAGING SIGNAL TRAFFIC IN A 5G OR OTHER NEXT GENERATION WIRELESS NETWORK

TECHNICAL FIELD

The subject application is related to wireless communication systems, such as a fifth generation ('5G') or other next generation wireless network, and, for example, traffic management and resource utilization.

BACKGROUND

With increases in the number of devices accessing wireless networks, balancing the load of devices that are serviced by different cells has become even more important than in the past. One way of allocating resources of wireless connection points is to differentiate between control channels, typically used to carry resource scheduling assignments and other control information, and data channels, and channels used to carry data.

Different approaches can be used to try to reduce overloading of these types of channels, individually. In many circumstances, however, existing traffic management approaches fail to incorporate significant factors that can impact the performance of both the network of wireless connection points, and devices served by the network.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
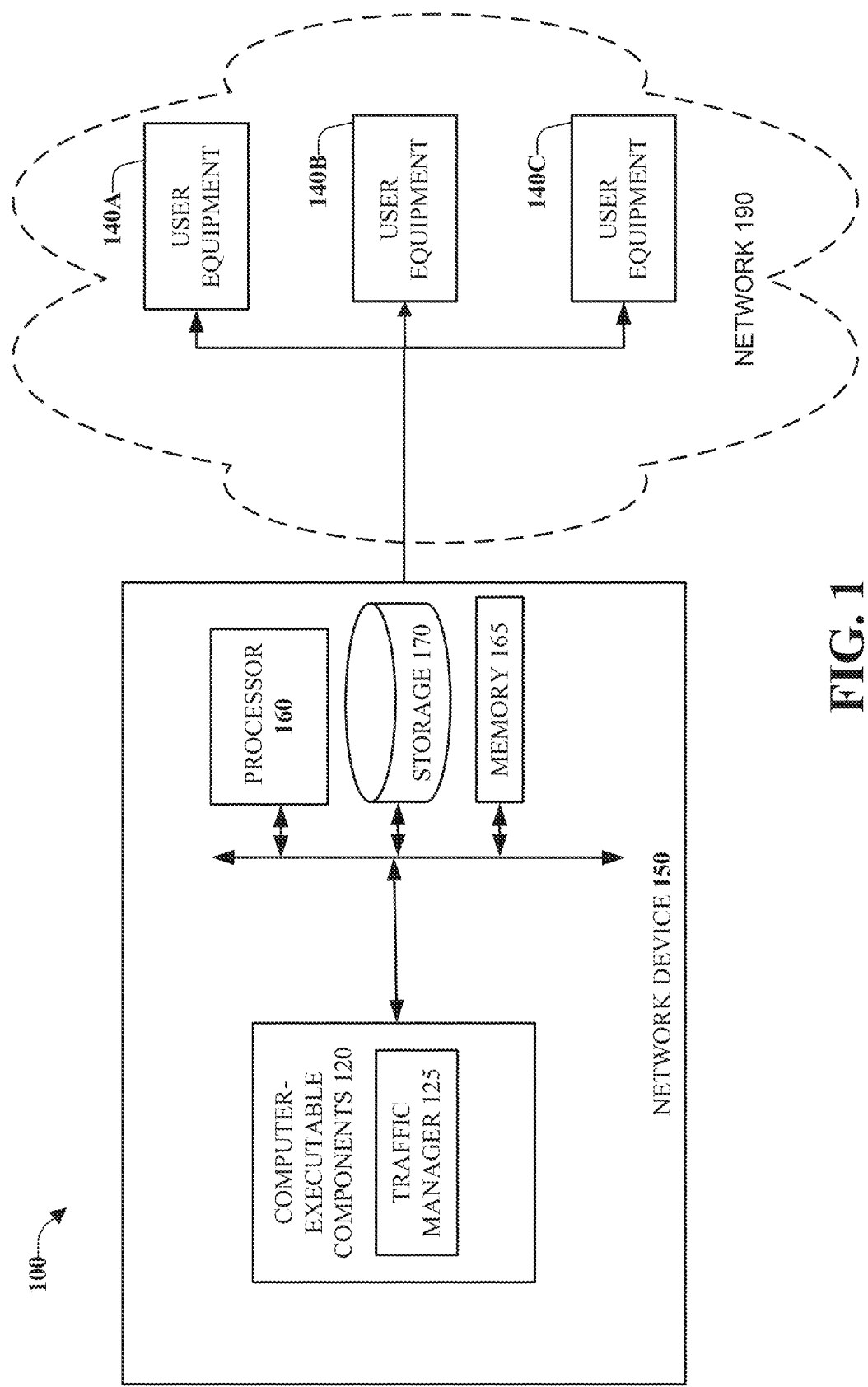
FIG. 1 is an architecture diagram of an example system that can facilitate managing signal traffic in a wireless network, in accordance with one or more embodiments.

Generally speaking, in one or more embodiments, a network device can facilitate managing signal traffic in a wireless network. In addition, one or more embodiments described herein can be directed towards a multi-connectivity framework that supports the operation of New Radio (NR, sometimes referred to as 5G). As will be understood, one or more embodiments can allow an integration of UEs with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" are used herein. These terms may be used interchangeably, and refer to any type of network node that can serve user equipment and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, remote radio unit (RRUs), remote radio head (RRH), nodes in distributed antenna system (DAS), etc.

As noted above, wireless connection point resources can be allocated based on a differentiation between channels, with different approaches being used to try to reduce overloading of different types of channels, individually, e.g., control channels and signal channels. Problems with this approach can be aggravated based on a preference for allocating resources to data signal channels, without sufficient consideration of other factors, e.g., control signal channel overloading. As discussed further below, additional negative results can occur in traffic management approaches based on a number of times a UE is handed off from one cell to another, e.g., because UE resources can be expended based on these handoffs.

By incorporating an approach that evaluates many different factors, one or more embodiments described herein can improve the performance of both a network of wireless connection points, and devices served by the network. It should be noted that, although several examples discussed herein describe improvements based on allocation of wireless control channels and signal channels between cells, these examples are non-limiting, and one or more embodiments can be applied to different types of channels in different types of wireless networks.

FIG. 1 is an architecture diagram of an example system 100 that can facilitate managing signal traffic in a wireless network, in accordance with one or more embodiments. For purposes of brevity, description of some elements and/or processes of embodiments discussed further below are omitted in this discussion of FIG. 1.

System 100 can include network device 150 communicatively coupled to UEs 140A-C via network 190. Network 190 can include a wireless communication system, and thus can include one or more communication service provider networks that facilitate providing wireless communication services to various UEs, including UEs 140A-C, via network devices 150 and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large-scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.). As described further with FIGS. 2-6 below, network 190 can be formed by multiple transceivers, with overlapping coverage areas serving one or more UEs 140A-C.

According to multiple embodiments, network device 150 can include memory 165 that can store one or more computer and/or machine readable, writable, and/or executable components 120 and/or instructions that, when executed by processor 160, can facilitate performance of operations defined by the executable component(s) and/or instruction(s). For example, memory 165 and storage 170 can store computer and/or machine readable, writable, and/or executable components 120 and/or instructions that, when executed by processor 160, can facilitate execution of the various functions described herein relating to network device 150.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1106 of FIG. 11 discussed below. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1104 of FIG. 11 discussed below. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1100 and FIG. 11. In one or more embodiments, such computer and/or computing-based elements can be used in connection with implementing one or more of the systems, devices, components, and/or computer-implemented operations shown and described in connection with FIG. 1 or other figures disclosed herein.

An example computer-executable component 120 that can be used by one or more embodiments is traffic manager 125. In some embodiments, this component can receive channel utilization information from wireless cells of network 190, and can reallocate UEs among different wireless cells to reduce overloading and increase network 190 performance. Different example approaches that can be used by traffic manager 125 are discussed below.

Figure 2:
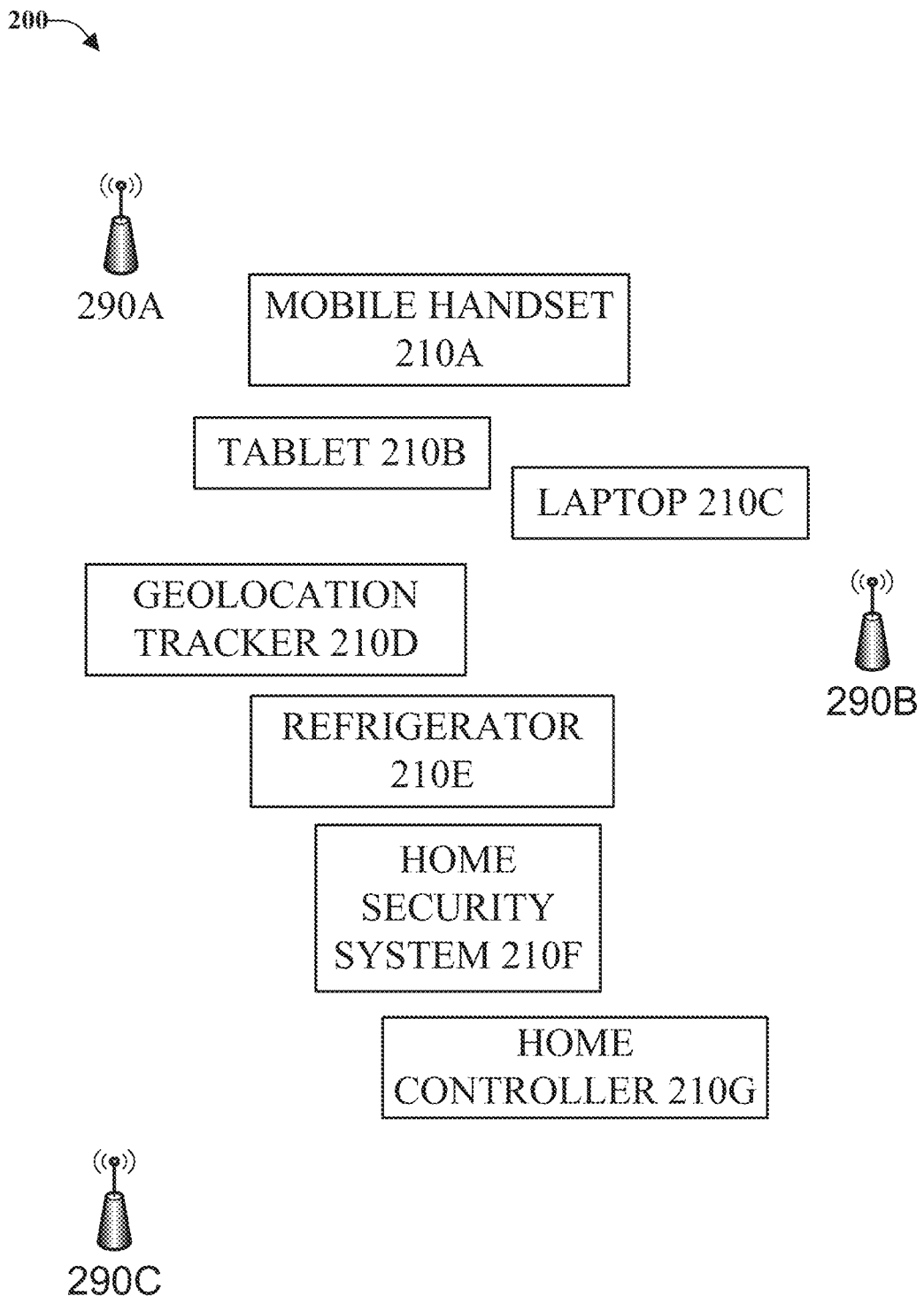
FIG. 2 is a diagram of an example coverage area with overlapping cell coverage serving UEs, and result from cell placement, in accordance with one or more embodiments.

FIG. 2 is a diagram of an example coverage area 200 with overlapping cell coverage serving UEs 210A-G, and result from cells 290A-C, in accordance with one or more embodiments. For purposes of brevity, description of like elements and/or processes employed in other embodiments is omitted.

As noted above, and described further with FIG. 10 below, in some embodiments the non-limiting term user equipment (UE) is used. As broadly used herein, this term can refer to any type of wireless device that can communicate with a radio network node in a cellular or mobile communication system. Examples of user equipment include, but are not limited to, a target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles, and other equipment that can provide similar functions. Example UEs are described further with FIGS. 9 and 10 below.

It should be noted that, as used to describe some embodiments, cell can refer to a geographical area covered by a cellular telephone transceiver (e.g., network device 150 and cells 290A-C), with a network of coordinated cells (e.g., cells 290A-C) being termed a group of cells of a wireless network. As depicted in FIG. 1, cells can be positioned so as to not overlap other cells (e.g., network 190 can be formed by one cell serving UEs 140A-C), or more typically, be configured so as to overlap, e.g., in FIG. 2, cells 290A-C serve UEs 210A-G. As described further herein, when UEs are served by overlapping cell coverage areas, they can be served exclusively by the transceiver of a cell.

One or more embodiments described herein describe approaches that can be used in some circumstances, to manage the allocation of resources to one or more UEs by one or more overlapping cell transceivers.

In one or more embodiments, UEs 210A-G can be served by physical control and data channels, e.g., PDCCH and PDSCH in the LTE downlink. A physical control channel signal can be transmitted as an aggregation of one or several consecutive control channel elements (CCEs), where a control channel element, in some circumstances, can correspond to nine resource element groups. PDSCH (Physical Downlink Shared Channel) can be the main data bearing channel which can be allocated to users on a dynamic and opportunistic basis.

PDCCH is the physical channel that can carry scheduling assignments and other control information downlink, e.g., downlink control information (DCI). The control information includes downlink scheduling assignments, which can be used to carry the information needed to receive data on the PDSCH, and uplink scheduling grants, which can be used to indicate the shared uplink resources (Physical Uplink Shared Channel, PUSCH) can a UE can use to send data to the a base station, e.g., cells 290A-C.

As discussed further below, channels of cells 290A-C can become overloaded, with this overloading caused by different factors, and having different implications, for different types of channels. In one or more embodiments, overloading of multiple types of channels can be addressed simultaneously and can evaluate many different factors associated with these overloaded channels. As noted above, some example types of channels discussed herein include control and data channels.

For example, in some circumstances control channel (e.g., PDCCH) overload can cause service performance deterioration for UEs connected to a wireless cell system (i.e., congestion, or blockage) even if data channels (e.g., PDSCH) have enough resources. In another example, a control channel overload can impact performance of data channels, even if radio network QoS mechanisms are employed to address congestion for data channels. In other words, a PDCCH overload can, in some circumstances cause poor performance for high priority data channel users (i.e., users with a high priority QoS class identifier (QCI)). To address these problems, one or more embodiments can provide additional traffic management approaches. In contrast to one or more embodiments described herein, many traffic management mechanisms use either control or data channel utilization independently, which may, as discussed further herein, yield to inefficient resource utilization and large signaling overhead. For example, although 3GPP support QoS, QoS is only supported on data channels (e.g., PDSCH), 3GPP does not support QoS for control channels (e.g. PDCCH). In addition to performance degradation for currently connected UEs based on control channel overload, the cell system itself can be degraded based on new UEs attempting to connect to overloaded cells being rejected, e.g., getting "attach request reject" responses due to unavailable control channel resources.

Approaches that only address data channel overload can be ineffective in addressing control channel overload, e.g., in some circumstances, there is no correlation between control channel utilization and data channel utilization, i.e. because each UE 210A-G uses a certain amount of control channel resources for each UE, a large number of IoT devices connected to a eNB may overload PDCCH, while plenty of PDSCH resource are available.

Another approach, often termed carrier aggregation, can be used to allocate frequency resources of different cells 290A-C to a single UE, e.g., mobile handset 210A can be served both by cell 290A as a primary component carrier (PCC) and cell 290B as a secondary component carrier (SCC), with frequency resources of these cell transceivers being aggregated to form a single channel, this channel typically being a data channel. Carrier aggregation is discussed further with FIGS. 4 and 6 below.

Returning to the elements depicted in FIG. 2, these elements depict a collection of UEs 210A-210G that, in some circumstances, have wireless connectivity characteristics that can be classified at least two ways. For example, mobile handset 210A, tablet 210B, and laptop 210C can be classified as generally using more data channel resources than geolocation tracker 210D, refrigerator 210E, home security system 210F, and home controller 210G. The latter groups can be considered as a part of an expanding IoT, that were not originally connected to data networks, and thus can be omitted from optimization approaches resource allocation. For example, generally speaking, both groups utilize similar amounts of control channel resources, e.g., ten mobile handsets 210A and sixty geolocation trackers 210D can utilize similar control channel resources as seventy mobile handsets 210A. In contrast, the latter group can utilize significantly more data channel resources than the former group, e.g., mobile handset 210A data communications can be significantly more than a stream of GPS data from geolocation tracker 210D. Thus, the group with ten mobile handsets 210A and sixty geolocation trackers 210D can use significantly less data than the group with seventy mobile handsets 210A.

Considered in more detail, while an optimization algorithm (e.g., current 4G and 5G approaches) considering only data channel utilization can identify the group with seventy (or fewer) mobile handsets 210A as being overloaded based on data channel utilization, this algorithm can miss a potential overloading of control channel resources, e.g., the seventy devices controlled in the first example group.

As described further below, one or more embodiments can use different approaches to improve the optimization approaches described above to achieve benefits that include, but are not limited to, improving efficient network resource utilization, reducing signaling overhead, reducing frequent attaching/detaching of UEs, and improving UE battery life, e.g., some approaches can use a per-cell, PDCCH/PDSCH load balancing mechanism that considers a variety of factors described and suggested herein.

Example implementations of one or more embodiments can be adapted to conditions found in some 5G deployments, e.g., ultra-dense network deployments with a large number of small cells, traffic patterns with frequent movement of UEs across cells, and frequent attaching/deattaching of UEs to different cells to maintain connectivity. The improved forecasting of UE movement and hand-off balancing that can be provided by one or more embodiments in some circumstances apply well to similar types of conditions.

Figure 3:
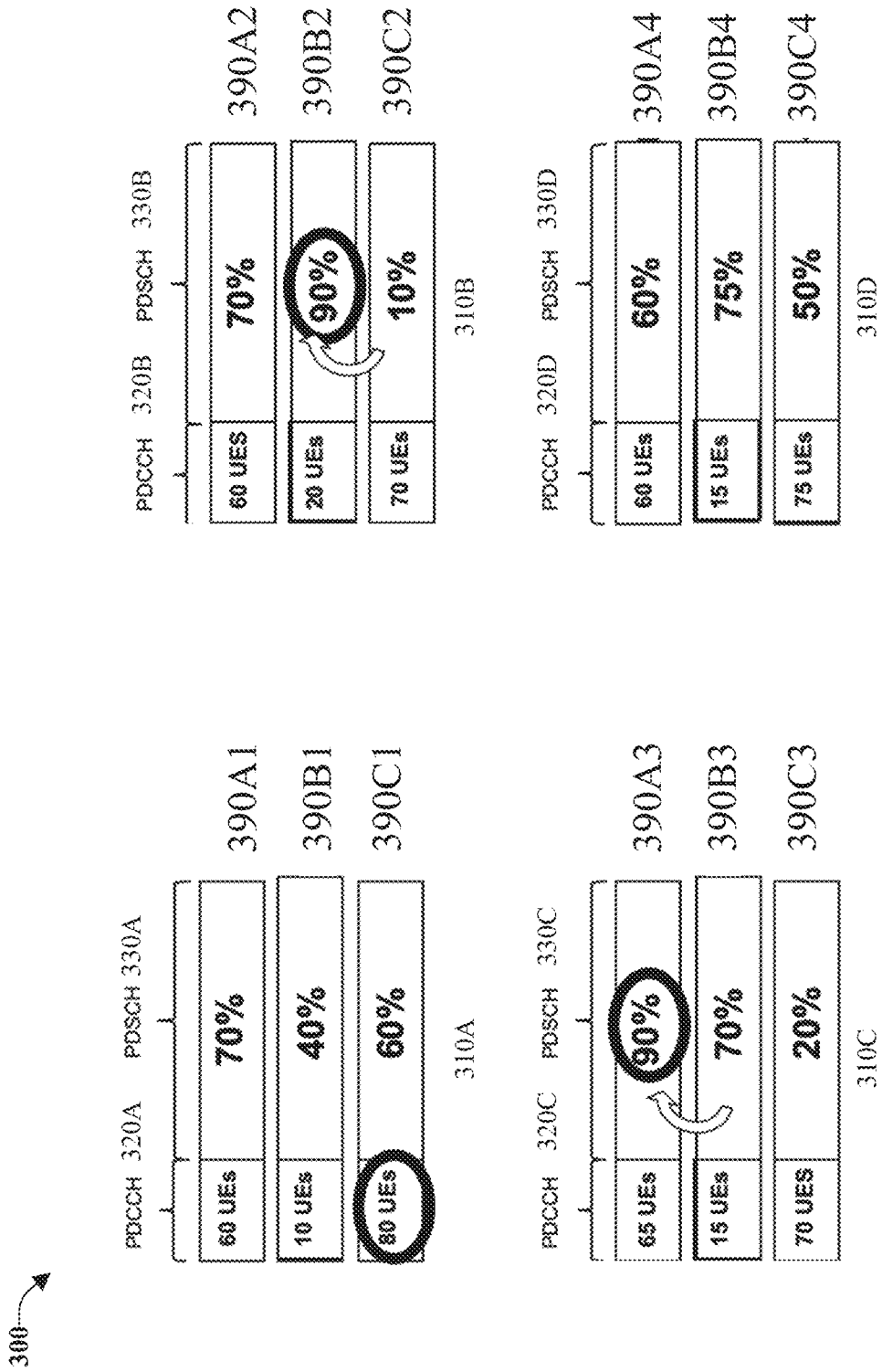
FIG. 3 depicts an example of managing the traffic of a PDCCH (Physical Downlink Control Channel) and PDSCH (Physical Downlink Shared Channel) over respective example states for overlapping cells, in accordance with one or more embodiments.

FIG. 3 depicts an example 300 of managing the traffic of PDCCH 320A-D and PDSCH 330A-D over respective example states 310A-D for overlapping cells 390A-C, in accordance with one or more embodiments. For purposes of brevity, description of like elements and/or processes employed in other embodiments is omitted.

As discussed above, PDCCH 320A overload in a given cell may cause traffic offload (e.g., handover of UEs to another cell) to a neighboring cell, which then may yield to PDSCH overload on this cell, therefore causing additional traffic offload events. This situation can lead to multiple handover events which can result in large signaling overhead and UE battery drainage. Example states 310A-D discussed below, describe different approaches to traffic management that can cause the above noted problems, and provide example approaches that contrast with one or more embodiments described herein.

In example state 310A, 80 UEs are served by cell 390C1, and of these UEs, 70 of then are IoT devices, which in this example consume 10% of the PDSCH 330A load of cell 390C1, e.g., mobile headset 210A. The remaining 10 UEs (e.g., heavy data using UEs, such as UEs 210A-C of FIG. 2) can consume 50% load of PDSCH 330A load of cell 390C1. It's worth noting that these example values illustrate the lack of a direct relationship between a number of devices and the percentage data channel utilization, e.g., the ten UEs of 390B1 use 40% available data channel capacity, while eight times as many devices only use 60% of 390C1 data channel resources.

It should be noted that, notwithstanding the traffic management adjustments described below with states 310B-D, as noted above, in many circumstances, approaches to traffic management do not trigger adjustments based on PDCCH 320A overloading. For these approaches, instead of making the adjustments described below to achieve an example equilibrium state 310D, these approaches would determine that cells 390A1-C1 were already at an equilibrium based on the PDSCH 330A utilization values (e.g., 70%, 40%, and 60%) of this example. As noted above, this lack of consideration of PDCCH 320A can cause significant issues, even for cells (e.g., cells 390A1-C1) with relatively low PDSCH 330A utilization.

Continuing this example, with an approach that can consider PDCCH 320A utilization, an example traffic management approach can determine that PDCCH 320A of 390C1 is overloaded because the serviced UEs exceed a threshold, e.g., 75 UEs. Thus, in an example, based on this determination, PDCCH 320A based traffic management can trigger cell 390C1 to offload 10 UEs to a different available ell, e.g., cell 390B1.

After this offloading, in example state 310B, cell 390C2 has 70 UEs and cell 390B2 has 20 UEs. In this example, because cell 390C1 is at 60% PDSCH 330A capacity, the ten heavy data using UEs noted above can be selected to be offloaded. Thus, the extra 10 UEs offloaded to cell 390B2, cause the PDSCH 330A utilization if this cell 290B2 to increase from 40% to 60%. Thus, in this example 10 UEs had a triggered handoff event (e.g., consuming processor and battery resources. Although, in this example the cost of these 10 handovers is not considered, in one or more embodiments discussed below this and other factors can be incorporated into traffic management approaches.

As a result of the handoff of 10 selected UEs discussed above PDCCH 320A utilization has reduced by 10 to 70 UEs, and PDCCH 320B has increased by 10 to 20 UEs, e.g. highlighted by arrow 375. Based on this offload of heavy data using devices, PDSCH 330B utilization has dropped from 60% to 10%. Although beneficial results for state 310B can be noted for cell 390C2, because of the ten heavy data using devices offloaded to cell 390B2, the PDSCH 330B utilization for cell 390B2 has increased to 90%. As discussed further below, in alternative embodiments, this type of traffic management result can be avoided by one or more embodiments by using different approaches described herein.

In example state 310C, a threshold can be applied to PDSCH 330C of cell 390B3, and a determination can be made that cell 390B3 is overloaded, e.g., an example threshold being 75%. Thus, PDSCH 330C traffic management can be triggered to address this overload, e.g., by offloading some UEs of cell 390B3 to cell 390A3. In this example, 5 UEs of the previously offloaded 10 heavy data using UEs can be selected for offloading to cell 390A3, thus reducing the PDSCH 330C utilization from 90% to 70% for cell 390B3. For cell 390A3, after receiving the 5 heavy data use UEs, PDSCH 330C utilization increases to 90% of capacity. It should also be noted that the same 5 data heavy UEs have been offloaded twice in a short period of time, and 5 other data heavy UEs have been offloaded once. Because, in some circumstances, data heavy UEs can be associated with high-priority system users (e.g., as compared to IoT devices), this this approach can be targeting devices for offloading devices can degrade the user experience of these high-priority users, e.g., by reducing battery life and degrading performance of UEs.

Moving to state 310D, because of the 90% PDSCH 330C utilization of cell 390A3, the example 75% threshold for PDSCH 330C utilization has been exceeded, and PDSCH 330C traffic management can be triggered to offload UEs from cell 390A4 to cell 390C4, e.g., offloading devices back to the cell that was originally adjusted in example state 310A, discussed above. In this example, more data heavy UEs are selected for offloading from cell 390A4 to cell 390C4, resulting in an increase of PDSCH 330D utilization from 20% to 50% for cell 390C4 and a reduction in PDSCH utilization from 90% to 60% in cell 390A4.

Thus, in this example, at example state 310D, after three sets of offloading instructions, no PDCCH 320D/PDSCH 330D overloading occurs in any cells 390A4-C4. In addition, 20 handovers occurred, with all of the handovers occurring for potentially high-priority users, and 5 of the UEs affected requiring multiple (2×) handovers. As noted throughout this disclosure, several aspects of the approach described above, can result large signaling overhead and UE battery drainage for affected device.

Figure 4:
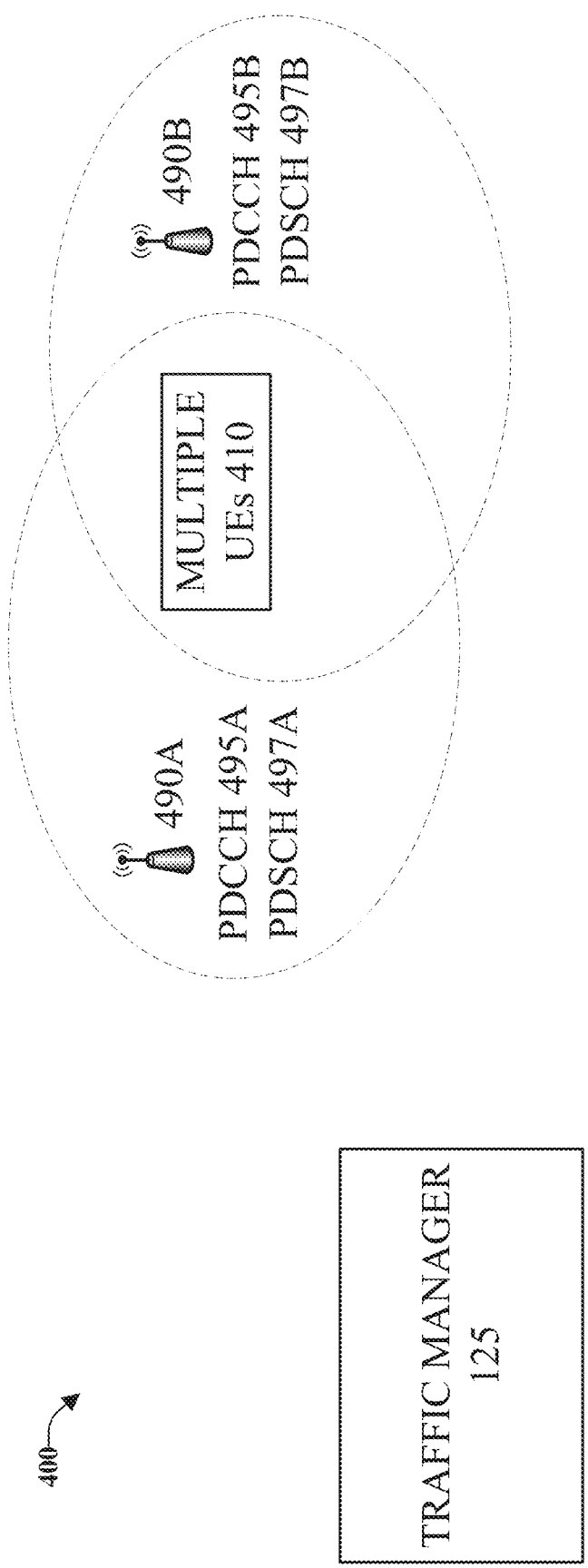
FIG. 4 depicts an example of multiple user equipments (UEs) being served by cells and the traffic manager, in accordance with one or more embodiments.
Figure 5:
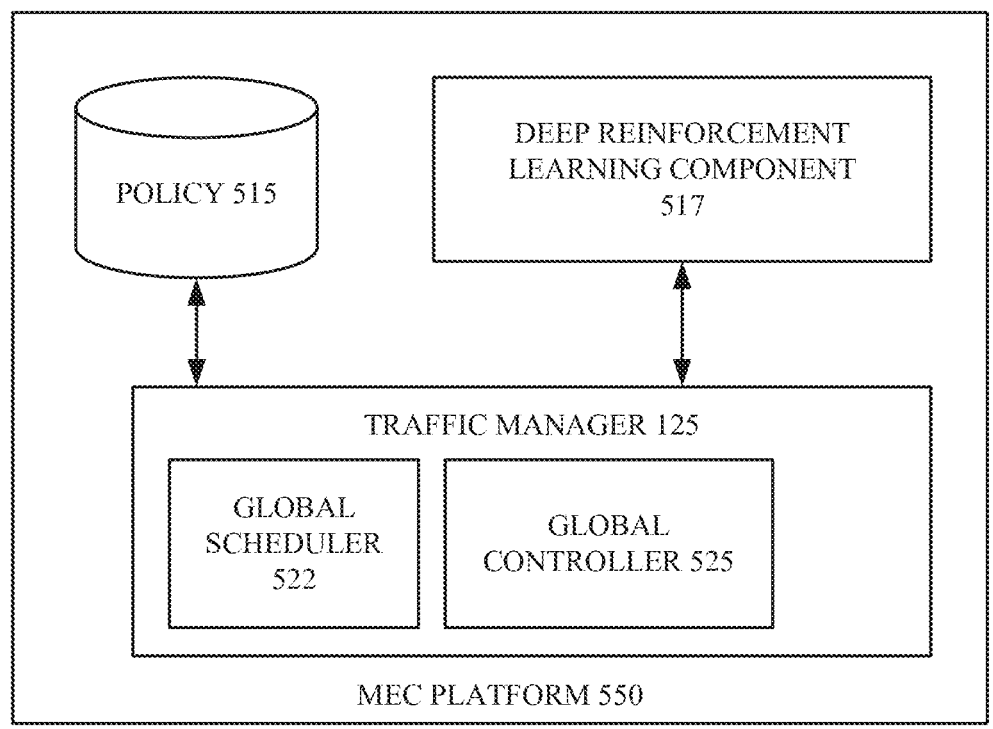
FIG. 5 depicts an example with a more detailed view of the traffic manager integrated within a multi-access edge computing (MEC) platform, in accordance with one or more embodiments.

FIGS. 4-5 are discussed together below to illustrate characteristics of one or more embodiments. FIG. 4 depicts an example 400 of multiple UEs 410 being served by cells 490A-B and traffic manager 125, in accordance with one or more embodiments. FIG. 5 depicts an example 500 with a more detailed view of traffic manager 125 integrated within a multi-access edge computing (MEC) platform 550, in accordance with one or more embodiments. For purposes of brevity, description of like elements and/or processes employed in other embodiments is omitted.

In the example 400 implementation of traffic manager 125 of FIG. 4, traffic manager 125 can be implemented as a part of MEC platform 550, and include global scheduler 522 and global controller 525. Alternately, traffic manager 125 can be implemented at a RAN intelligent controller (RIC) and as a part of self-organizing network (SON) approaches.

In an example depicted in FIG. 4, traffic manager 125 can receive, for a group of cells 490A-B, a control channel utilization value for a control channel (e.g., PDCCH 495A-B) and a data channel utilization value for a data channel (e.g., PDSCH 497A-B). As depicted, cells 490A-C have overlapping coverage of multiple UEs 410, and initially in this example, ones of multiple UEs 410 can be served PDCCH 495A-B and PDSCH 497A-B channels by either cell 490A or 490B.

Continuing this example, global controller 525 can, based on the control channel utilization value and a threshold (e.g., policy 515), for cell 490A of the group of cells 490A-B, develop a channel allocation that can balance use of PDCCH 495A-B resources and PDSCH 497A-B resources for cells 490A-B, e.g., a channel allocation that identifies cells that are overloaded in either or both PDCCH 495A-B resources and PDSCH 497A-B resources. In one or more embodiments, the generated channel allocation can be communicated to cells 390A and 390C by global scheduler 522, triggering a handover of In one or more embodiments, when one or both of PDCCH and PDSCH utilization is greater than a predefined thresholds (e.g., defined in policy 515), deep reinforcement learning and global control can creates a per-Cell PDCCH/PDSCH allocation that can that increase the balance PDCCH and PDSCH resources, and minimize traffic offload events, e.g., avoiding identified problems with approaches described above, with FIG. 3. In addition to increasing the balance of resources, one or more embodiments of global controller 525 can use reinforcement machine learning to predict handovers of connected UEs.

In alternative or additional embodiments, to address issues of channel overloading described above, global controller 525 can use cross-carrier scheduling carrier aggregation to offload the traffic of channels across multiple carriers, e.g., cells 490A-B. Example channels that can be allocated using this approach include, but are not limited to, PDSCH 497A-B channels. One having skill in the relevant art(s), given the description herein, will appreciate that adding this additional degree of freedom can achieve even better outcomes in the reduction of overloaded channels. For example, in the approach described in FIG. 3 above, enabling the allocation of PDSCH 330A-D resources between cells 390A-D could enable a transition from an initial overloaded state to an equilibrium state, with fewer handoffs and allocation adjustments than the three examples described.

For example, returning to example states 310A and 310D of FIG. 3 above, instead of increasing cell 390B2 PDSCH utilization to 90% after the first allocation, this allocation could also use cross-carrier scheduling to keep cell 390C2 serving the PDSCH 330B channels of the 5 heavy data use UEs whose PDCCH 320B channel allocations can be offloaded to cell 390B1. Such an approach could result in all three cells 390A1-C1 being at an equilibrium in a shorter time using less resources, and with only 5 UEs offloaded once.

As discussed further with FIG. 6 below, in an example cross-carrier scheduling approach that can be used by one or more embodiments, PDCCH 495A-B allocations to one cell, termed the primary component carrier (PCC) and one or more additional carriers that can be configured to provide PDSCH 497A-B channels are termed secondary component carriers (SCCs).

Thus, in one or more embodiments, for UEs identified by global controller 525, actions that can be performed can include, but are not limited to: Handover channel allocations to another cell, e.g., both PDCCH 495A and PDSCH 497A allocations offloaded from cell 490A to cell 490B; Handover control channel allocations to another cell and trigger cross-carrier scheduling of one or more channels, e.g., cell 490A offloads PDCCH 495A to cell 490B, and allocates the load of PDSCH 497A-B to either cell 490A or 490B; not handover to another cell and trigger CA cross-carrier scheduling, e.g., same as previous action, but control channel allocations remain at cell 490A; No action.

Figure 6:
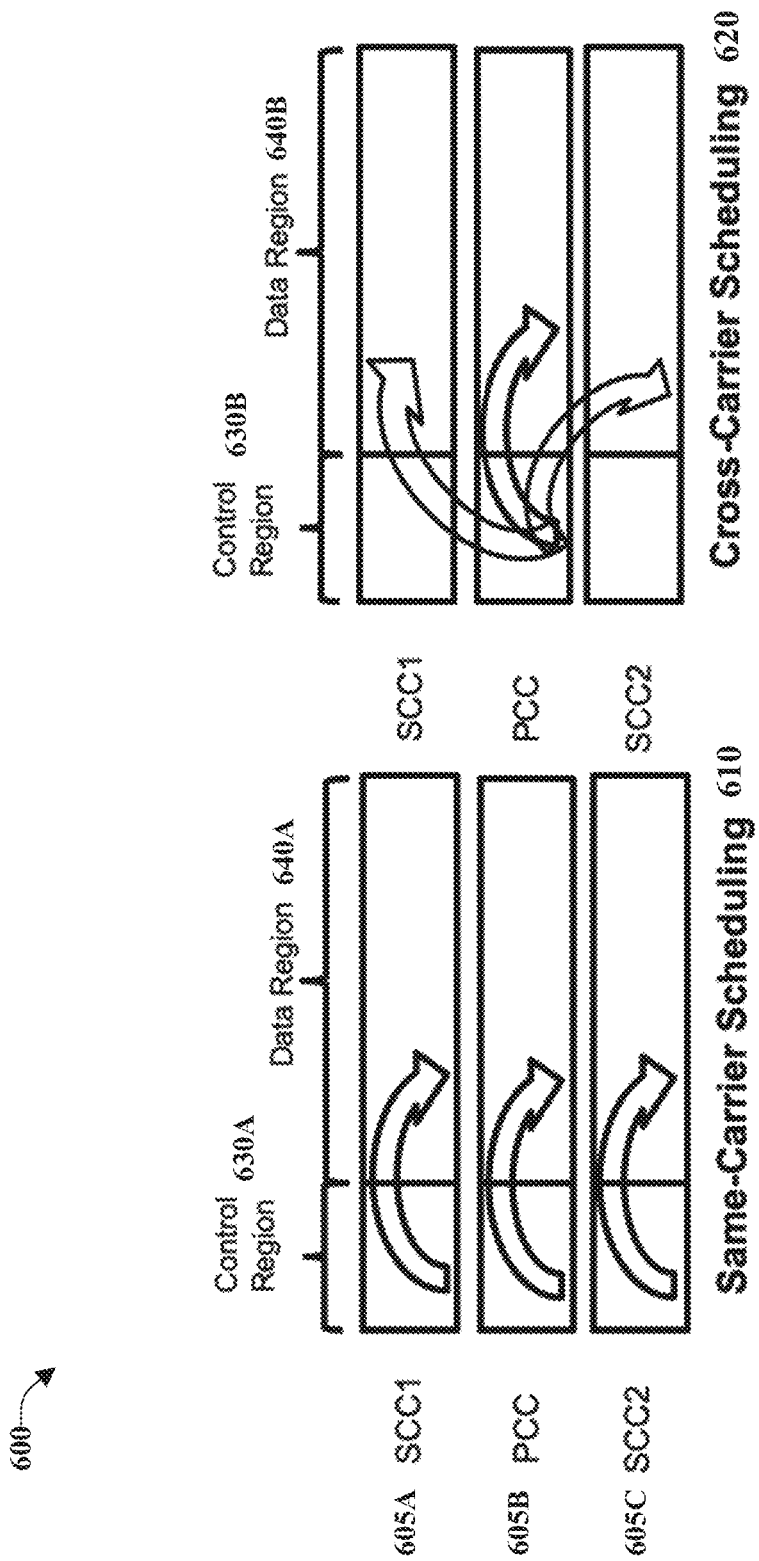
FIG. 6 illustrates a comparison of same-carrier scheduling for control and data channels and cross-carrier scheduling for control and data channels, in accordance with one or more embodiments.

FIG. 6 illustrates a comparison 600 of same-carrier scheduling for control and data channels 610 and cross-carrier scheduling for control and data channels 620, in accordance with one or more embodiments. For purposes of brevity, description of like elements and/or processes employed in other embodiments is omitted.

As depicted, control region 630A-B corresponds to the portion of a signal that can relay the PDCCH, and data region 640A-B corresponds to the portion of a signal that can relay the PDSCH discussed above. In this figure, cells 605A-C can each provide a signal with control region 630A and data region 640A.

For example, in the diagram of same-carrier scheduling 610, each control region 630A corresponds to a data region 640A, with arrows indicating that each control region in this example corresponding to a different UE. In this allocation approach, cell 605A cannot provide data region 640A resources to the UE controlled by control region 630A of cell 605B. As discussed above, in some circumstances this can lead to problems identified with the discussion of FIG. 3, e.g., excessive handoffs of UEs required to achieve an equilibrium, and increased signaling overhead.

The depiction of cross-carrier scheduling 620 indicates some of the advantages that can be achieved by one or more embodiments described herein. For example, in this diagram cell 605B is termed a PCC because the control region of cell 605B is governing data regions 640B in SCC1 cell 605A and SCC2 cell 605C, as well as local data region 640B of cell 605B. Although FIG. 6 depicts three arrows, it is important to note that cross-carrier scheduling is used when data region 640B of at least one of cells 605A and 605C is controlled by PCC cell 605B. In this example, the cross-carrier scheduling 620 diagram is describing the cell 605A-C for a UE serviced by control region 630B of cell 605B. As noted with the description of FIGS. 3-4 above, in some circumstances this approach can achieve the optimization benefits described above.

Figure 7:
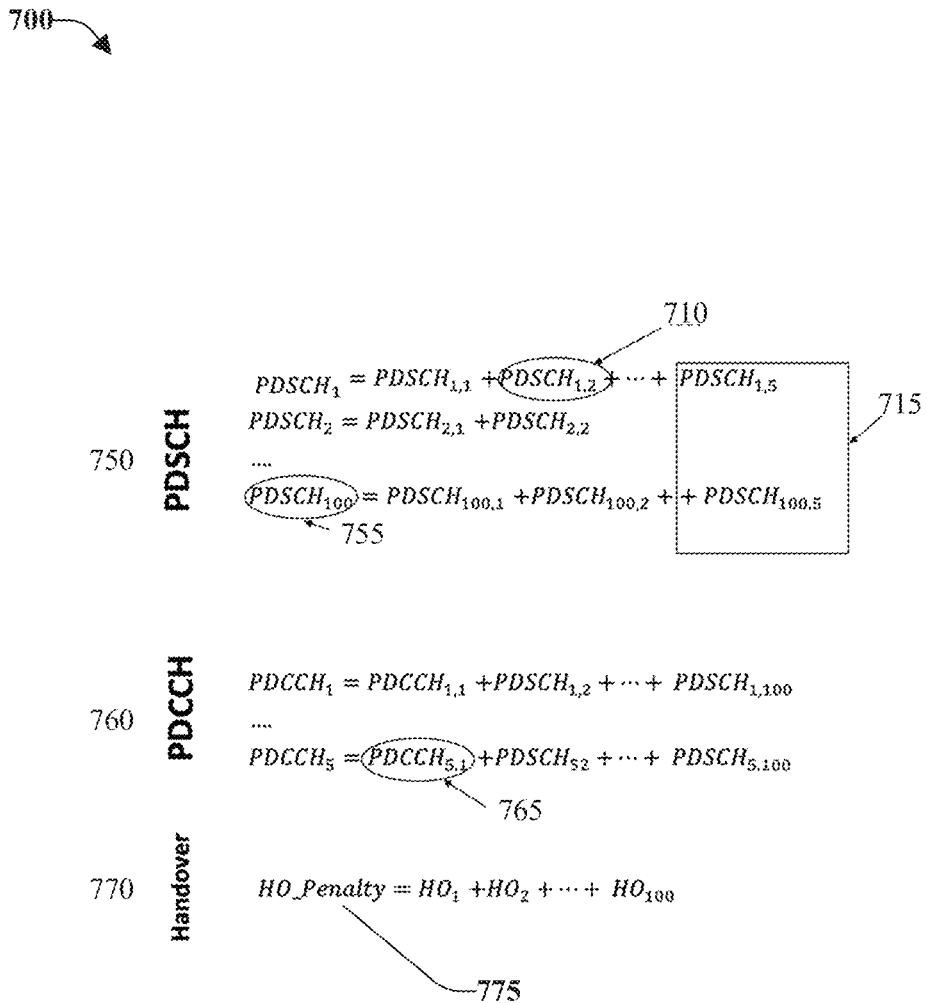
FIG. 7 depicts an example set of formulas that can determine the aggregated load of data signals, PDSCH load and control signals, PDCCH load for a group of 5 cells that provide service to 100 UEs, in accordance with one or more embodiments.

FIG. 7 depicts an example 700 set of formulas that can determine the aggregated load of data signals, PDSCH load 750 and control signals, PDCCH load 760 for a group of 5 cells that provide service to 100 UEs, in accordance with one or more embodiments. For purposes of brevity, description of like elements and/or processes employed in other embodiments is omitted. In this example, each of the 100 UEs is initially connected to only one of the five cells, some UEs are CA capable, and all five cells are CA capable, e.g., can provide cross-carrier scheduling as discussed with FIG. 6 above.

As depicted in FIG. 7, arrow 710 corresponds to the PDSCH load of $UE_1$ on $cell_2$, and arrow 755 corresponds to the total PDSCH load of $UE_{100}$ on all of the five overlapping cells. Further, box 715 corresponds to the aggregated PDSCH load on $cell_5$ from all 100 UEs. Based on the application of a threshold to the PDSCH load determinations shown above, in this example, global controller 525 can detect one or both of PDCCH and PDSCH overloading. In one or more embodiments, global controller 525 can utilize data from deep reinforcement learning component 517 to determine a UE allocation scenario, e.g., whether and how to handoff UEs among the five cells. In an example result, the model results can indicate at least one of, to handover UEs from one cell to another cell, (2) to force CA to some of the UEs, and combinations of these two actions.

In this implementation, the model provided by deep reinforcement learning component 517 can indicate specific CA parameters for each UE/Cell pair to allow intelligent PDSCH load distribution across the cells. Further, the model can consider the implication of a handover of a UE to another cell (e.g., handover load 770), with an assessment of a penalty 775 (weight/weighting) factor, to apply to other results of the model.

Returning to the determination of PDSCH load 750 depicted in FIG. 7, in one or more embodiments, if global controller mandates UE to trigger CA cross-carrier scheduling, then UE can split its PDSCH load into multiple cells (e.g., $PDSCH_{1,2}>0$, otherwise $PDSCH_{1,2}=0$), with the aggregated PDSCH load 750 for a given cell being lower than a threshold.

Returning to the determination of PDCCH load 760, in one or more embodiments, for this example, PDCCH UE load should be assigned to only one cell of the five cells, e.g., as discussed above with the example of FIG. 6, and the aggregated PDCCH load for a cell should lower than a threshold.

Figure 8:
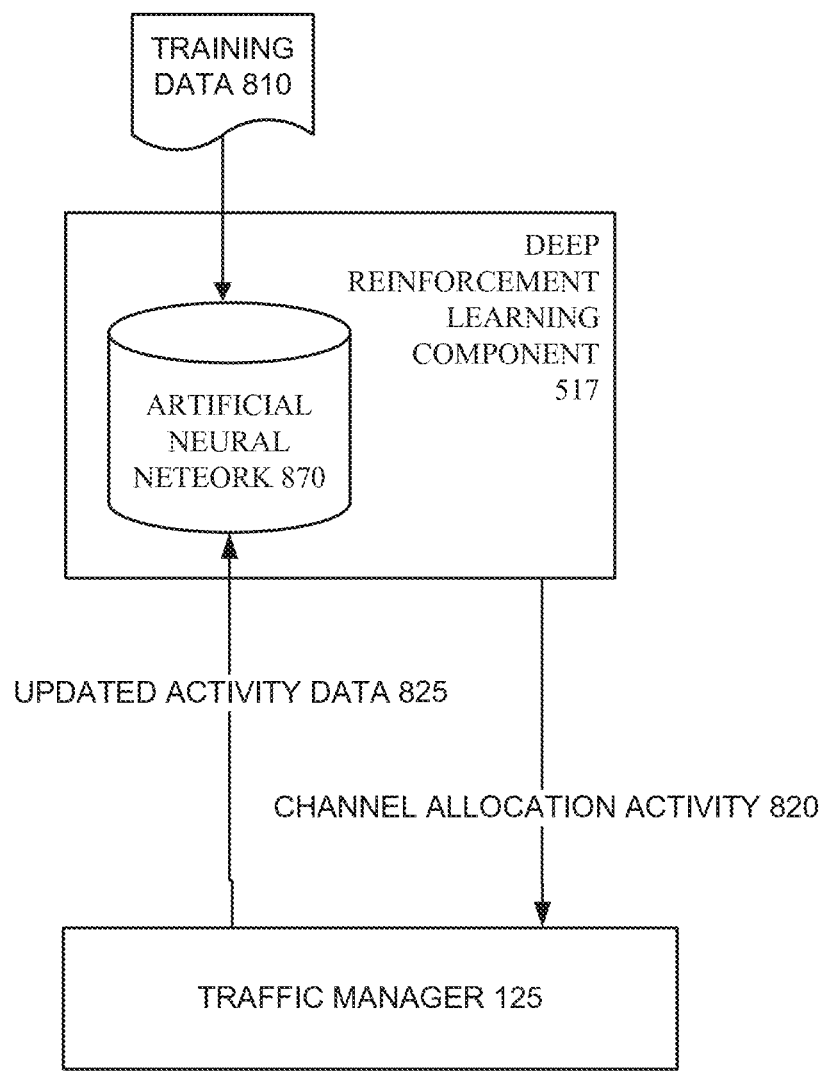
FIG. 8 illustrates an implementation of an example, non-limiting system that can facilitate managing signal traffic in a wireless network by employing deep reinforcement learning component that can include for example, an artificial neural network (ANN), in accordance with one or more embodiments described herein.

FIG. 8 illustrates an implementation of an example, non-limiting system that can facilitate managing signal traffic in a wireless network by employing deep reinforcement learning component 850 that can include for example, an artificial neural network (ANN) 870, in accordance with one or more embodiments described herein. For purposes of brevity, description of like elements and/or processes employed in other embodiments is omitted.

In certain embodiments, channel allocations that can achieve equilibrium states can be generated based on classifications, correlations, inferences and/or expressions associated with principles of artificial intelligence. For example, deep reinforcement learning component 850 can employ different approaches including, but not limited to, expert systems, fuzzy logic, SVMs, Hidden Markov Models (HMMs), greedy search algorithms, rule-based systems, Bayesian models (e.g., Bayesian networks), ANNs, other non-linear training techniques, data fusion, utility-based analytical systems, systems employing Bayesian models, etc.

In another aspect, deep reinforcement learning component 850 can perform a set of machine learning computations associated with the detection of different network conditions. For example, deep reinforcement learning component 850 can perform reinforcement learning analysis, a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and a set of different machine learning computations to analyze channel allocation states, and generated channel allocation plans, in accordance with one or more embodiment.

In an example AI/ML approach that can be utilized by one or more embodiments, ANN 870 can be optimized (also termed "trained" herein) by submitting optimizing data to the ANN that describes channel allocations with associated results. It should be noted that this description of employing an ANN is non-limiting, e.g., one or more embodiments can use other types of machine learning algorithms that receive input and perform analysis, e.g., as described above.

In one or more embodiments, to facilitate the use of ANN 870 for channel allocation, training data 810 can be created by combining operational data with confirmed conclusions about the operational data. For example, configuration and results data from the examples discussed with FIGS. 3-5 above can be used as training data. In addition, traffic manager 125 can collect the results of the channel allocations generated for the examples of FIGS. 3-4 discussed above and relay the results be used as additional training data for ANN 870.

Figure 9:
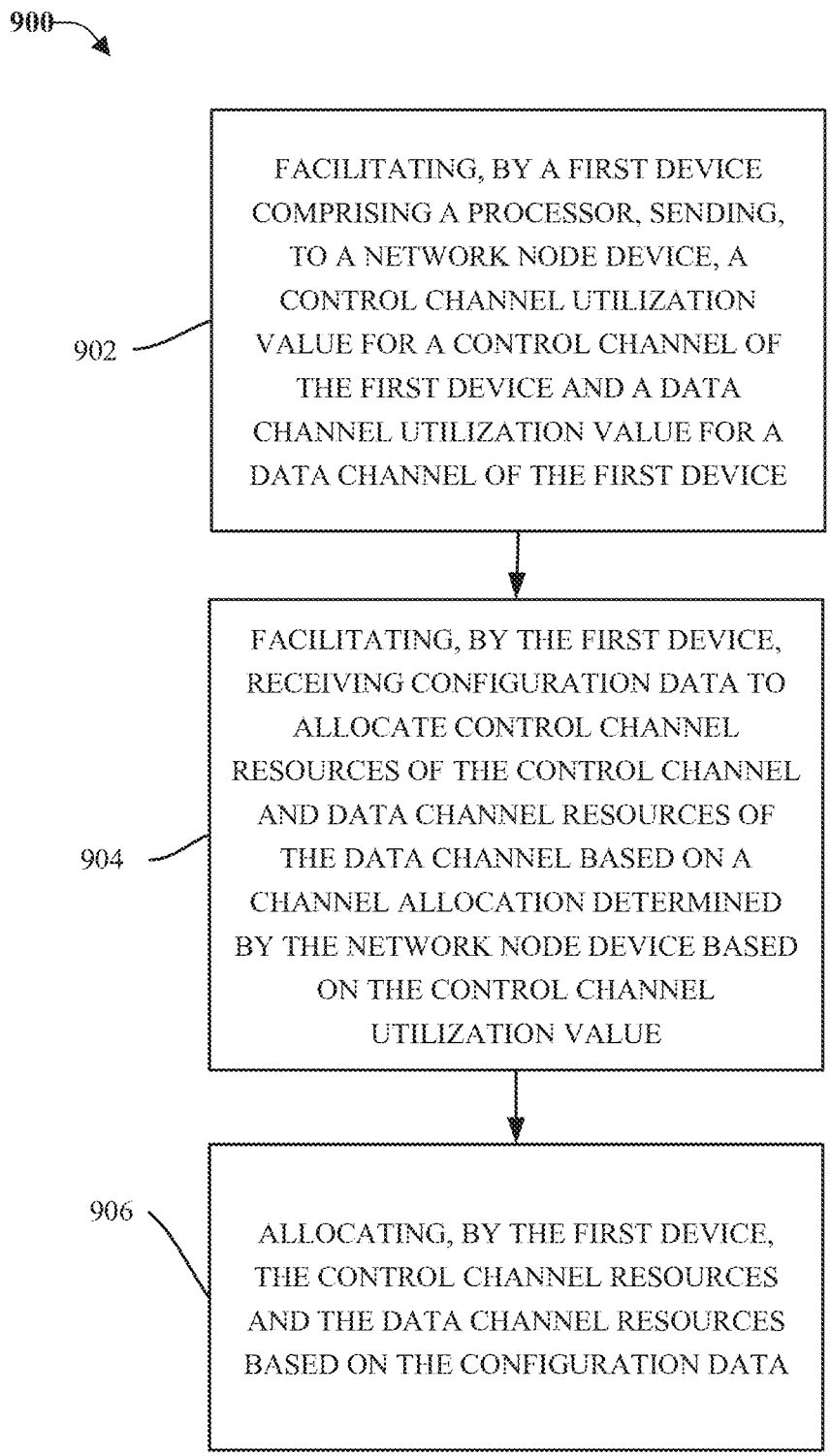
FIG. 9 illustrates a flow diagram of an example method that can facilitate managing signal traffic in a wireless network, in accordance with one or more embodiments.

FIG. 9 illustrates a flow diagram of an example method 900 that can facilitate managing signal traffic in a wireless network, in accordance with one or more embodiments. For purposes of brevity, description of like elements and/or processes employed in other embodiments is omitted.

At 902, method 900 can facilitate, by a first device comprising a processor, sending to a network node device, a control channel utilization value for a control channel of the first device and a data channel utilization value for a data channel of the first device. For example, in an embodiment a method can communicate, by UE 140A comprising a processor 160, to a network node (e.g., utilizing communication component 1010), a control channel utilization value for a control channel (e.g., PDCCH 495A) of the first device and a data channel utilization value for a data channel of the first device.

At 904, method 900 can facilitate, by the first device, receiving configuration data to allocate control channel resources of the control channel and data channel resources of the data channel based on a channel allocation determined by the network node device based on the control channel utilization value. For example, in an embodiment a method can facilitate, by the first device, receiving configuration data (e.g., from traffic manager 125) to allocate control channel resources and data channel resources based on a channel allocation determined by the network node device based on the control channel utilization value.

Figure 10:
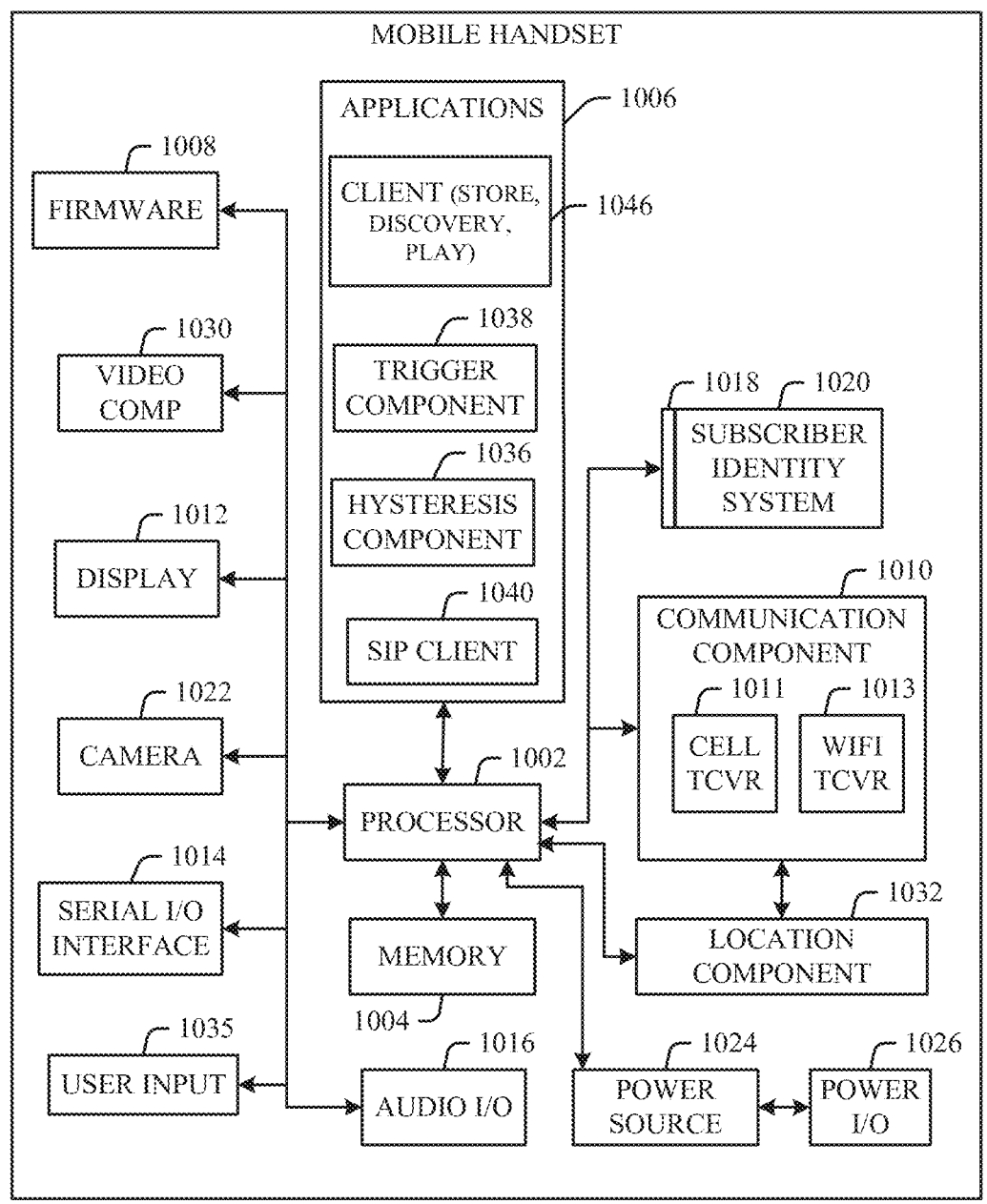
FIG. 10 illustrates an example block diagram of an example mobile handset operable to engage in a system architecture that can facilitate processes described herein, in accordance with one or more embodiments.

At 906, method 900 can allocate, by the first device, control channel resources and data channel resources based on the configuration data. For example, in an embodiment a method can allocate, by cell 490A, the control channel resources and the data channel resources based on the configuration data (e.g., from traffic manager 125). FIG. 10 illustrates an example block diagram of a mobile handset 1000 operable to engage in a system architecture that facilitates wireless communications according to one or more embodiments described herein. For purposes of brevity, description of like elements and/or processes employed in other embodiments is omitted.

Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

The network device 150 can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

Network 190 can employ various cellular systems, technologies, and modulation schemes to facilitate wireless radio communications between devices (e.g., UEs 140A-B, and 310, and the network devices 150 and 350). While example embodiments include use of 5G NR systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), LTE, LTE frequency division duplexing (FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 140A-B and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 11:
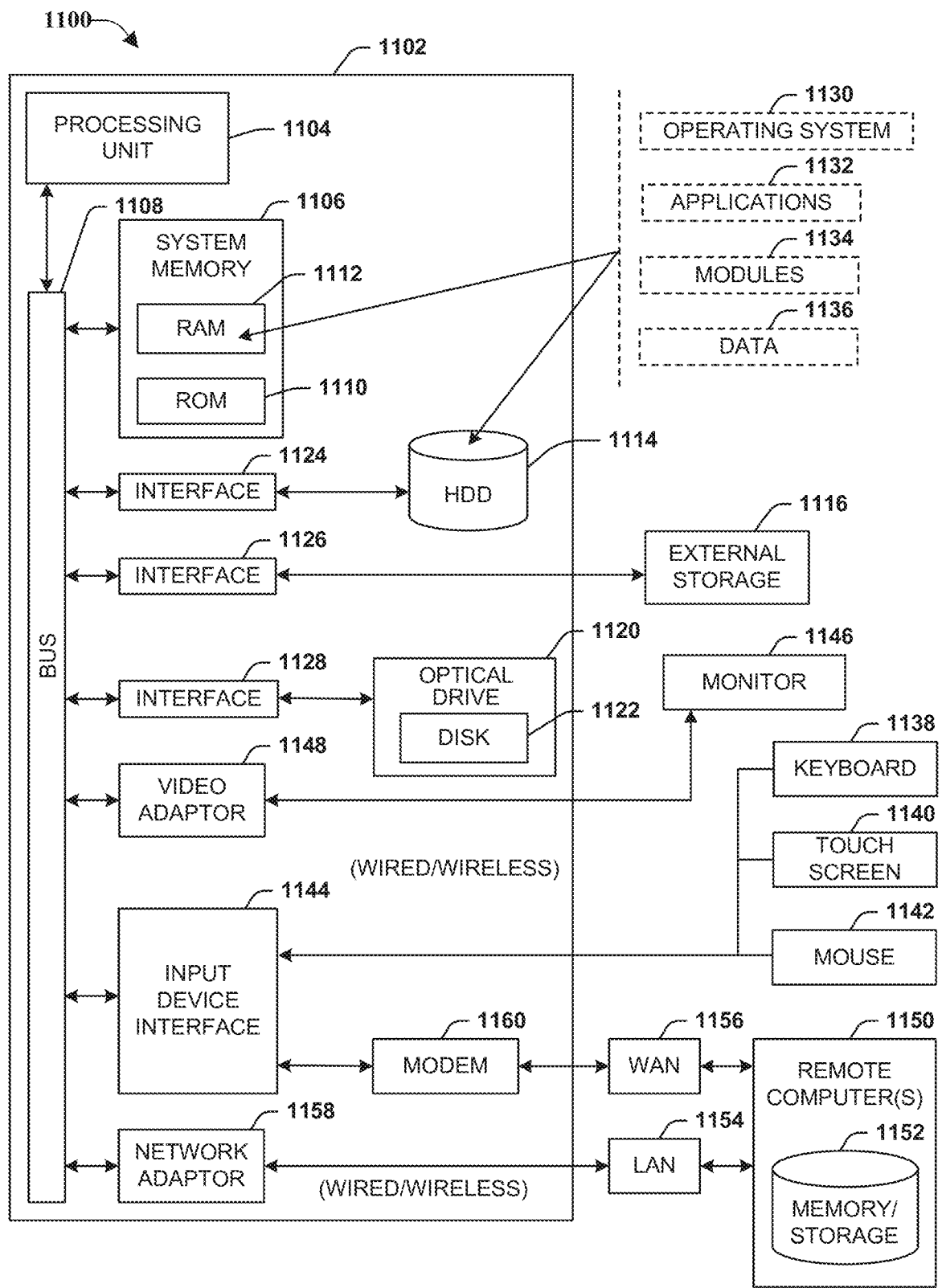
FIG. 11 illustrates an example block diagram of an example computer operable to engage in a system architecture that can facilitate processes described herein, in accordance with one or more embodiments.

Referring now to FIG. 11, in order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods of one or more of the embodiments described herein can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes,"

"has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, embodiments are not to be limited to any single implementation, but rather is to be construed in breadth, spirit and scope in accordance with the appended claims.

What is claimed is:

1. A device, comprising:
   a processor; and
   a memory that stores executable instructions that, when executed by the processor, facilitate performance of operations, comprising:
   receiving, for a group of cells, a control channel utilization value for a control channel and a data channel utilization value for a data channel;
   based on a combination of the data channel utilization value and the control channel utilization value, and a threshold, selecting, for a first cell of the group of cells, a channel allocation that increases a balance of use of control channel resources of the control channel and data channel resources of the data channel for the first cell; and
   based on the channel allocation, configuring the first cell of the group of cells to allocate the control channel resources and the data channel resources of the first cell, wherein the channel allocation comprises an allocation of radio frequencies for use by the first cell for the control channel and the data channel.

2. The device of claim 1, wherein the channel allocation selects the channel allocation that increases the balance of the use of the control channel resources and the data channel resources to reduce a number of traffic offload events for the first cell.

3. The device of claim 1, wherein the control channel comprises a physical downlink control channel.

4. The device of claim 1, wherein the data channel comprises a physical downlink shared channel allocated to a user equipment on an opportunistic basis.

5. The device of claim 1, wherein generating the channel allocation for the first cell comprises incorporating a second cell in the channel allocation, and wherein the channel allocation increases the balance of the use of combined control channel resources and combined data channel resources for the first cell and the second cell.

6. The device of claim 5, wherein the channel allocation specifies that ones of the combined data channel resources be respectively allocated to the first cell and the second cell, resulting in an offload of data channel traffic of a user equipment from the first cell to the second cell.

7. The device of claim 5, wherein the channel allocation specifies that the combined control channel resources be allocated to one of the first cell and the second cell, resulting in an offload of control channel traffic of a user equipment from the first cell to the second cell.

8. The device of claim 1, wherein the control channel utilization value comprises an aggregated control channel load for the first cell.

9. The device of claim 1, wherein configuring the first cell based on the channel allocation comprises configuring the first cell until combined control channel resources and combined data channel resources for the first cell and a second cell are determined to be in an equilibrium.

10. The device of claim 9, wherein the equilibrium is defined based on estimated traffic offload events for the first cell and the second cell.

11. A method, comprising:
    facilitating, by a first device comprising a processor, sending, to network node equipment, a control channel utilization value for a control channel of the first device and a data channel utilization value for a data channel of the first device;
    facilitating, by the first device, receiving configuration data to allocate control channel resources of the control channel and data channel resources of the data channel based on a channel allocation selected by the network node equipment based on the control channel utilization value and the data channel utilization value; and
    allocating, by the first device, the control channel resources and the data channel resources based on the configuration data, wherein the configuration data comprises allocation data representative of an allocation of radio frequencies for use by the first device for the control channel and the data channel.

12. The method of claim 11, wherein the channel allocation was selected by the network node equipment to increase a balance of use of the control channel resources and the data channel resources, to decrease a number of handover events by user equipment for the first device.

13. The method of claim 11, wherein the control channel comprises a downlink control information channel.

14. The method of claim 11, wherein the allocating comprises allocating the data channel resources to a user equipment on an opportunistic basis.

15. The method of claim 11, wherein the allocating comprises allocating the control channel resources and the data channel resources based on a balancing of first usage of combined control channel resources and second usage of combined data channel resources for the first device and a second device.

16. The method of claim 15, wherein the configuration data specifies that ones of the combined data channel resources of the first device and the second device be respectively allocated to the first device and the second device, and wherein the method further comprises, based on the configuration data, offloading, by the first device, data channel traffic of a user equipment from the first device to the second device.

17. A non-transitory machine-readable medium, comprising executable instructions that, when executed by a processor of a user equipment, facilitate performance of operations, comprising:

receiving, for first base station equipment, a first control channel utilization value for a first channel and a second data channel utilization value for a second channel;

based on the first utilization value and the second utilization value, and a criterium, generating, for the first base station equipment, a channel balancing process that balances use of control channel resources of the first channel and data channel resources of the second channel for the first base station equipment; and based on the channel balancing process, configuring the first base station equipment to perform an allocation of the control channel resources and the data channel resources of the first base station equipment, wherein the allocation of the control channel resources and the data channel resources comprises an allocation of radio frequencies for use by the first base station equipment for the first channel and the second channel.

18. The non-transitory machine-readable medium of claim 17, wherein generating the channel balancing process for the first base station equipment comprises including second base station equipment in the channel balancing process, and wherein the channel balancing process balances first use of combined control channel resources and second use of combined data channel resources for the first base station equipment and the second base station equipment.

19. The non-transitory machine-readable medium of claim 18, wherein the channel balancing process specifies that the combined data channel resources respectively allocated to the first base station equipment and the second base station, resulting in an offload of data channel traffic of a user equipment from the first base station equipment to the second base station equipment.

20. The non-transitory machine-readable medium of claim 18, wherein the channel balancing process specifies that the combined control channel resources be allocated to one of the first base station equipment and the second base station equipment, resulting in an offload of control channel traffic of a user equipment from the first base station equipment to the second base station equipment.

* * * * *